United States Patent [19]

Stürtz et al.

[11] 4,410,212
[45] Oct. 18, 1983

[54] MOTOR VEHICLE

[75] Inventors: Günter Stürtz, Leinfelden; Herbert Holtze, Weil der Stadt; Dietrich Rothacker; Gerhard Burk, both of Sindelfingen, all of Fed. Rep. of Germany

[73] Assignee: Daimler-Benz Aktiengesellschaft, Stuttgart, Fed. Rep. of Germany

[21] Appl. No.: 264,221

[22] Filed: May 18, 1981

[30] Foreign Application Priority Data

May 16, 1980 [DE] Fed. Rep. of Germany ....... 3018732

[51] Int. Cl.³ .......................................... B62D 25/08
[52] U.S. Cl. .................................. 296/189; 180/271; 180/315; 280/784
[58] Field of Search ............... 180/232, 271, 90, 90.6, 180/334, 315, 89 R; 280/784; 296/189; 74/470, 474, 512, 547

[56] References Cited

U.S. PATENT DOCUMENTS 3,794,342 2/1974 Froumajou et al. ................ 280/784

FOREIGN PATENT DOCUMENTS 2841988 4/1980 Fed. Rep. of Germany ...... 180/315

*Primary Examiner*—David M. Mitchell
*Attorney, Agent, or Firm*—Craig & Burns

[57] ABSTRACT

A motor vehicle provided with an engine space or trunk arranged in the forward end thereof and with an end wall located between the space or trunk and the passenger compartment. A brake pedal, mounted in a suspended fashion connected to a braking device located outside of the passenger compartment, extends through the end wall. The braking device is arranged so that, upon a frontal structural deformation caused by a collision, the brake device executes a pivotal motion by which the brake pedal is guided away from the driver of the vehicle and against the end wall. A two-stage deformation member is provided which includes a rigid upper pot-shaped deformation member to which the braking device is attached. A pedal shaft of the brake pedal is mounted in an upper zone of the upper pot shaped member, the upper pot shaped member passes over by way of a step or shoulder into a larger deformable lower pot-shaped member connected with the end wall. The lower pot-shaped deformation member is fashioned so that a larger deformation distance is available in an upper zone than in a lower zone thereof.

7 Claims, 1 Drawing Figure

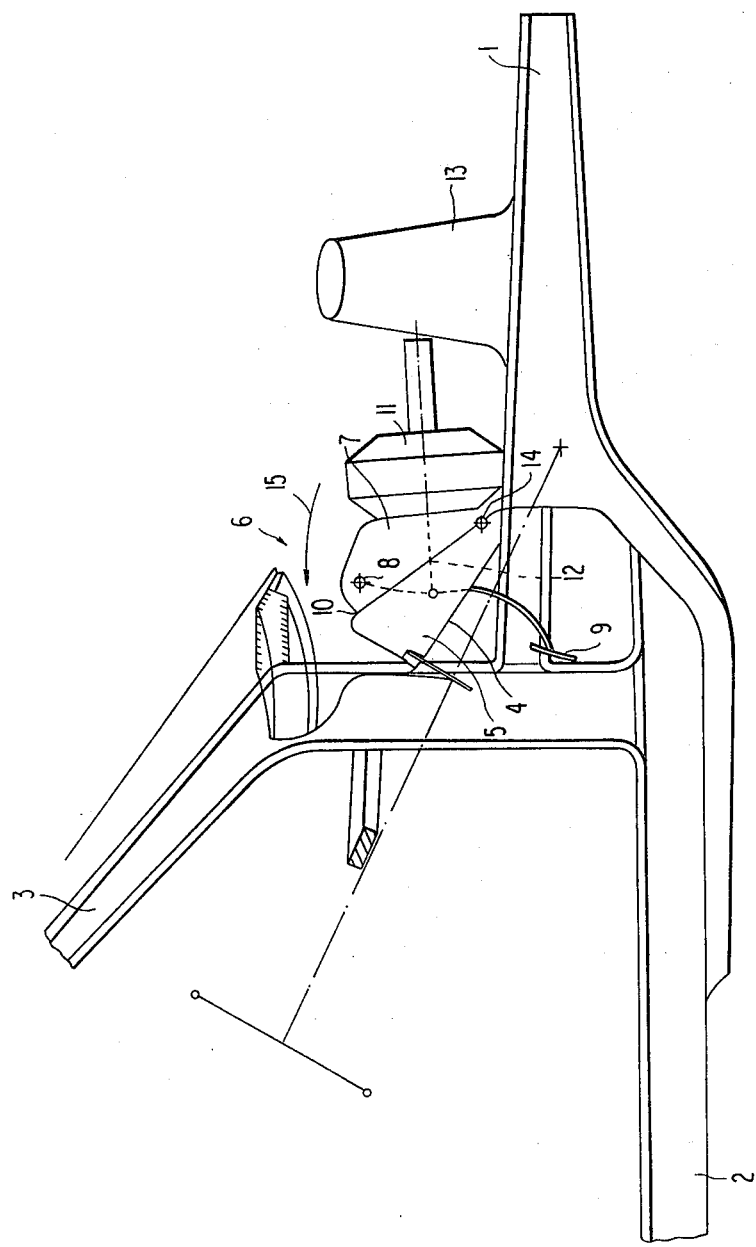

MOTOR VEHICLE

The present invention relates to a vehicle and, more particularly, to a motor vehicle provided with an engine compartment or trunk arranged forwardly of the vehicle and with an end wall disposed between the compartment and trunk for separating the same from a passenger space, and with a brake pedal, mounted in a suspended fashion and connected to a braking device located exteriorly of the passenger space, extending through the end wall wherein the braking device is arranged so that, upon a frontal structure deformation caused by a collision of the vehicle, the braking device executes a pivotal motion by which the brake pedal is guided away from the driver and against the end wall.

An arrangement of the aformentioned type has been proposed in, for example, German Offenlegungsschrift No. 2,841,988, with such an arrangement being developed because a practial analysis of traffic accidents revealed that the so-called zero degree frontal collision occurs only relatively rarely. In this type of direct collision wherein the entire frontal structure of the vehicle is under a uniform impact, only a relatively minor frontal structure deformation occurs as related to a velocity of the vehicle at the time of the collision.

Under practical conditions, it has been found that it is substantially more frequent for direct collisions to occur with a unilateral impact on the side of the vehicle facing oncoming traffic without there being a concomitant impact on the drive block. However, in these latter types of collisions, a substantially greater deformation of the frontal structure of the vehicle is incurred. Since the pedal system, especially the brake pedal with the braking device and master brake cylinder are arranged on this side of the vehicle exposed to collision forces, such structural part should not lead to a block formation but rather a possibility for yielding should be provided for these parts in case of a corresponding deformation of the frontal structure of the vehicle. Moreover, it is advantageous for the pedals to be moved away from the driver in case of an accident in order to avoid contusions and possible joint dislocations.

While some of the above noted safety requirements are partially met by the aforementioned proposed arrangement, a disadvantage resides in the fact that it contributes only very little if anything at all toward an energy absorption of the relatively heavy braking device and the components connected therewith in the event of a direct collison of the motor vehicle.

The aim underlying the present invention essentially resides in providing a motor vehicle of the aforementioned type which is constructed in such a manner that a substantial contribution is made toward an energy absorption while nevertheless retaining required kinematic relationships.

In accordance with advantageous features of the present invention, the braking device for the motor vehicle is mounted to a rigid upper portion of a two-stage pot-shaped deformation member, with a pedal shaft for the brake system of the vehicle being disposed in the rigid upper portion. The upper portion of the two-stage deformation member passes over by way of a step or shoulder into a larger deformable lower portion connected with the end wall separating the engine compartment or trunk from the passenger space. The lower portion of the pot-shaped deformation member is constructed in such a manner that a larger deformation distance is available in an upper zone then in the lower zone thereof.

Advantageously, in accordance with the present invention the lower portion of the pot-shaped deformation member is formed or shaped out of the end wall of the vehicle separating the engine compartment or trunk from the passenger space of the vehicle.

To enable a connection of the upper portion and lower portion which would be readily detachable, such connection may be effected by, for example, suitable screws or bolts; however, it is also possible to fix the upper and lower portions to each other by, for example, welding.

In order to provide for a controlled motion process during deformation, advantageously, the lower portion of the deformation member, as seen in a lateral view, is of a triangular configuration and arranged in such a manner that a corner of the lower portion of the deformation member formed by the two longer sides of the triangle points approximately downwardly.

Accordingly, it is an object of the present invention to provide a motor vehicle construction which avoids, by simple means, shortcomings and disadvantages encountered in the prior art.

Another object of the present invention resides in providing a motor vehicle construction which minimizes if not avoids the possibility of injuries to an operator by portions of the brake system of the vehicle during a direct collision.

Yet another object of the present invention resides in providing a motor vehicle construction which enables a mounting of a brake pedal of the motor vehicle in such a manner that, upon a direct collision, the brake pedal is directed along a controlled path during deformation.

A further object of the present invention resides in providing a motor vehicle construction which is simple and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein:

The FIGURE is a partially schematic side view of a front portion of a body structure of a passenger motor vehicle constructed in accordance with the present invention.

Referring now to the single FIGURE of the drawing, according to this FIGURE, the rough body structure of the motor vehicle includes a pair of forward side rails 1 passing over toward the rear of the vehicle into lateral side rails 2 forming the so-called door step rails, and a forward or A-column 3. A two stage pot-shaped deformation member generally designated by the reference numeral 6 includes a lower deformable pot-shaped member 5 and a smaller rigid upper pot-shaped member 7 arranged on the lower pot-shaped member 5. The deformable lower pot shaped member 5 may be shaped or formed out of an end wall 4 separating an engine compartment from a passenger space or cell of the vehicle.

A pedal shaft 8 is accommodated in an upper or top zone of the upper pot-shaped member 7, with a brake pedal 9 being suspended from the pedal shaft 8. A transsistion between the lower pot-shaped member 5 and the upper pot-shaped member 7 is effected by way of a step 10 by which, in case of a collision, a deformation of the lower pot-shaped member 5 is initiated in a conventional manner of pot-shaped deformation members.

A braking device 11, of conventional construction, which also contains a master brake cylinder (not shown) is attached to the upper pot shaped member 7 and is linked to the brake pedal 9 by way of a suitable conventional linkage 12.

Upon a frontal collision and corresponding frontal structure deformation, the braking device 11 is stressed, for example, by a dome 13 which serves for accommodating a shock absorber leg or the like (not shown) and the rigid upper pot shaped member 7 is immersed or displaced into the thus deforming lower pot-shaped member 5. Since the path of deformation of the lower pot-shaped member 5 available for this purpose is present primarily in an upper zone thereof, the braking device 11 is essentially pivoted about an imaginary transverse axis 14 in a direction of the arrow 15 with an energy absorption.

Since the braking device 11 is connected to the brake pedal 9 through the linkage 12, during the above-noted deformation process, the brake pedal 9 is pivoted in a direction away from the driver toward the front in a direction of the end wall 4 thereby diminishing any danger to the driver or operator of the vehicle from the brake pedal 9.

As shown in the drawing, the lower pot-shaped member 5 has a triangular configuration and is arranged at the end wall 4 in such a manner that a corner formed by the two longer sides of the triangle points in an approximately downward direction.

While we have shown and described only one embodiment in accordance with the present invention, it is understood that the same is not limited thereto but is suscepitble of numerous changes and modifications as known to one having ordinary skill in the art, and we therefore do not wish to be limited to the details shown and described herein, but intend to cover all such modifications as are encompassed by the scope of the appended claims.

We claim:

1. A motor vehicle comprising an end wall means for separating a passenger compartment with an engine space or trunk arranged in a front of a vehicle, a braking means arranged outside of the passenger compartment, a two stage deformation means being provided for mounting the braking means at the end wall means so as to enable the braking means to execute a pivotal motion upon a frontal structural deformation of the vehicle due to a collision, the two stage deformation means includes a rigid upper pot-shaped deformation member, a larger lower pot-shaped deformation member arranged at the end wall means, and a shoulder means forming a transition between the upper and lower deformation members, and the brake means is attached to the rigid upper pot-shaped deformation member.

2. The motor vehicle according to claim 1, wherein the lower pot-shaped deformation member is constructed such that an upper zone of the lower deformation member has a greater deformation distance than a lower zone of said lower deformation member.

3. The motor vehicle according to claim 2, wherein a brake pedal means is provided for actuating the braking means, means are provided for suspending the brake pedal means from an upper zone of the upper deformation member in such a manner that, upon the pivotal motion of the braking means, the brake pedal means is guided in a direction toward the end wall means away from an operator of the vehicle.

4. A motor vehicle according to claim 3, characterized in that the lower deformation member is formed out of the end wall means.

5. The motor vehicle according to one of claims 1, 2, 3, or 4, wherein means are provided for detachably connecting the upper deformation member to the lower deformation member.

6. The motor vehicle according to one of claims 1, 2, 3, or 4, wherein means are provided for fixedly connecting the upper deformation member to the lower deformation member.

7. The motor vehicle according to one of claims 1, 2, 3, or 4, wherein the lower deformation member in a lateral view has a triangular configuration with two long sides connected by a shorter side, and the lower deformation member is arranged such that a corner formed by the two long sides points approximately in a downward direction.

* * * * *